United States Patent
Kossow et al.

(10) Patent No.: US 8,572,203 B1
(45) Date of Patent: Oct. 29, 2013

(54) SYSTEMS AND METHODS FOR PERSONALIZED CUSTOMER MESSAGES

(75) Inventors: Kevin Anthony Kossow, Boerne, TX (US); Evgenia Voskresenskaya Strudell, San Antonio, TX (US); Thomas Clark, San Antonio, TX (US); Michael C. Nickel, Boerne, TX (US); Julee Dyer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 997 days.

(21) Appl. No.: 11/747,199

(22) Filed: May 10, 2007

(51) Int. Cl.
*G06F 15/16* (2006.01)
*G06Q 30/00* (2012.01)
*G06Q 40/00* (2012.01)

(52) U.S. Cl.
USPC ........... 709/217; 709/200; 709/219; 709/227; 709/229; 709/250; 705/26.9; 705/27.2; 705/35

(58) Field of Classification Search
USPC ........... 709/217, 219, 227, 229, 250; 705/26, 705/27, 35
See application file for complete search history.

(56) References Cited

U.S. PATENT DOCUMENTS

| | | | | |
|---|---|---|---|---|
| 6,076,075 A * | 6/2000 | Teicher | ........................... | 705/41 |
| 6,167,383 A * | 12/2000 | Henson | ........................... | 705/26 |
| 6,442,529 B1 * | 8/2002 | Krishan et al. | .................. | 705/14 |
| 7,162,435 B1 * | 1/2007 | Nagano | ........................... | 705/22 |
| 7,483,857 B2 * | 1/2009 | Bansal et al. | .................. | 705/39 |
| 2007/0130338 A1 * | 6/2007 | Malik et al. | .................. | 709/225 |
| 2008/0091530 A1 | 4/2008 | Egnatios et al. | | |
| 2008/0195472 A1 * | 8/2008 | Shandelman et al. | .......... | 705/14 |

OTHER PUBLICATIONS

"Actuate BIRT 2.0 Allows Developers of Any Experience Level to Easily Build Complex Reports", [online]. Actuate Corporation, Mar. 20, 2006, [retrieved on May 10, 2007]. Retrieved from the Internet: <URL: http://global.actuate.com/uk/corporate/news/PressRelease.asp?ArticleId=9755>, 3 p.

"Exstream Diaglogue: The World Standard Software for Enterprise Personalization", [online]. SQLink Group, [retrieved on May 10, 2007]. Retrieved from the Internet: <URL: http://www.sqlink.com/Dialogue_brochure.pdf>,5 p.

(Continued)

*Primary Examiner* — Ranodhi Serrao
*Assistant Examiner* — Farrukh Hussain
(74) *Attorney, Agent, or Firm* — Brooks, Cameron & Huebsch, PLLC

(57) ABSTRACT

An identification of a customer and identification of a webpage to be transmitted to the customer from a first data system are received. Message content is selectively inserted from at least one second data system for the identified customer into the identified webpage. The first data system is thereafter notified to transmit the webpage from the first data system to a computer system associated with the identified customer. Message content may be generated by the at least one second data system relating to the customer's interaction with the at least one second data system. Selective insertion and notification may be achieved by a message system. The transmission of the customer/web page identification to the message system and the transmission of the identified web page to the customer may be achieved by the first data system. The display of the message content on the web page accessed by the customer via the first data system may notify the customer about the customer's interaction with the at least one second data system.

21 Claims, 7 Drawing Sheets

(56) References Cited

OTHER PUBLICATIONS

"Full Visibility that Drives Business Success", [online]. Onyx Software Corporation, Bellevue, WA, 2005, [retrieved on May 10, 2007]. Retrieved from the Internet: <URL: http://www.onyx.com/pdf/PerformanceMgmtBrochure.pdf>,4 p.

"VIAS: . . . Compiling Continually Updated, Categorized Information on Dynamic Topics (T99018)", [online]. University of Illinois at Urbana-Champaign, Office of Technology Management, [retrieved on May 10, 2007]. Retrieved from the Internet: <URL: http://www.otm.uiuc.edu/techs/techdetail.asp?id=268>,5 p.

Carey, M. , et al., "Keep Your Data Flowing: Accessing Multiple Data Sources Made Easy", [online]. Jan. 29, 2004 [retrieved on May 10, 2007]. Retrieved from the Internet: <URL: http://dev2dev.bea.com/pub/a/2004/01/carey_mangatani.html>,21 p.

\* cited by examiner

FIG. 5

Account Summary
Fixed Rate Loan — 602

Messages
● We have not yet received payment on account ending in 1234. Please pay online. —— 604

| | | | |
|---|---|---|---|
| Account Number: | 39090451 | Transit Routing (ABA) Number: | 314074269 |
| Account Owner: | PAT Q MEMBER —— 504 | | |
| | 123 ROLAND STREET | | |
| | TAYLOR TX 76574-1538 | | |
| Current Balance: | $11,216.12 * | | |

*This is your payoff amount for your loan for today only.
Get a future payoff quote for this loan.

| | |
|---|---|
| Collateral ID: | 1GCCS195128231506 |
| Collateral Description: | 2002 CHEVROLET S10 |

| | | | |
|---|---|---|---|
| Interest Paid YTD: | $212.16 | Last Payment Date: | Apr 10, 2006 |
| Interest Paid Last Year: | $494.38 | Last Payment Amount: | $260.46 |
| Original Loan Date: | May 28, 2005 | Amount Past Due: | $0.00 |
| Original Loan Amount: | $13,625.00 | Next Payment Date: | May 10, 2006 |
| Interest Rate: | 5.45% | Next Payment Amount: | $260.46 |

Date Range and Transaction Type
From: 10/16/2005   To: 04/14/2006   Display: All

Transactions from Oct 16, 2005 to Apr 14, 2006

| Date | Description | Amount | Principal Balance |
|---|---|---|---|
| Apr 10, 2006 | PRINCIPAL | $207.56 | $11,206.02 |
| Apr 10, 2006 | INTEREST | $52.90 | $11,206.02 |
| Mar 10, 2006 | PRINCIPAL | $211.80 | $11,413.58 |
| Mar 10, 2006 | INTEREST | $48.66 | $11,413.58 |
| Feb 10, 2006 | PRINCIPAL | $205.63 | $11,625.38 |
| Feb 10, 2006 | INTEREST | $54.83 | $11,625.38 |
| Jan 10, 2006 | PRINCIPAL | $204.69 | $11,831.01 |
| Jan 10, 2006 | INTEREST | $55.77 | $11,831.01 |
| Dec 10, 2005 | PRINCIPAL | $205.57 | $12,035.70 |
| Dec 10, 2005 | INTEREST | $54.89 | $12,035.70 |
| Nov 10, 2005 | PRINCIPAL | $203.80 | $12,241.27 |
| Nov 10, 2005 | INTEREST | $57.66 | $12,241.27 |

Printer-Friendly Version

⊞ Download Account Activity

I want to...
> View my bank account list
> Pay my bills

Account Services
> Make a principal payment
> Obtain a payoff quote
> Nickname this account

FIG. 6

SYSTEMS AND METHODS FOR PERSONALIZED CUSTOMER MESSAGES

CROSS REFERENCES

This application is related to U.S. applications entitled "SYSTEMS AND METHODS FOR PERSONALIZED CUSTOMER MESSAGES" (U.S. patent application Ser. No. 11/747,196) and "SYSTEMS AND METHODS FOR PERSONALIZED CUSTOMER MESSAGES" (U.S. patent application Ser. No. 11/747,198), each of which being filed on even date herewith.

TECHNICAL FIELD

The disclosure relates generally to electronic data processing systems. More particularly, example embodiments are directed to message system and method for centralizing and personalizing customer messages from one or more data systems.

BACKGROUND

Generally, in an online data processing system, such as an insurance system, a banking system, an investment system, a financial planning system, or the like, a user or customer of the online data processing system may receive messages related to the customer's account with the online data processing system.

However, in an online data processing system that includes plural or disparate constituent data systems, such as the data systems described above and the like, messages displayed by the online data processing system are generated by each continent data system. More specifically, the online data processing system makes custom calls, such as application protocol interface calls (API) calls or the like, to the constituent systems to gather message information to display to a customer of the online data processing system on various web pages of the data processing system. This type of message delivery from the disparate systems is inefficient and cumbersome.

Furthermore, even if each of the constituent systems allows for personalization of preferences for message delivery and the like for the customer's account, such personalization generally is set up by the customer or a customer service representative and the like with each constituent system of the online data processing system. This type of personalization is also inefficient and cumbersome.

SUMMARY

In accordance with an embodiment, there is provided a method, system and machine readable-medium for transmitting message data. An identification of a customer and identification of a webpage to be transmitted to the customer from a first data system are received. Message content is then selectively inserted from at least one second data system for the identified customer into the identified webpage. The first data system is thereafter notified to transmit the webpage from the first data system to a computer system associated with the identified customer.

In accordance with a another embodiment, there is provided a method, system and machine readable-medium for transmitting message data. An identification of a customer and identification of a webpage to be transmitted to the customer from a first data system are transmitted to a message system. Notification is thereafter received from the message system to transmit the webpage from the first data system to a computer system associated with the identified customer, the web page including selectively inserted message content from at least one second data system for the identified customer.

In accordance with a further embodiment, there is provided a method, system and machine readable-medium for conveying information to a customer. Message content for a customer is generated at at least one second data system relating to the customer's interaction with the at least one second data system. The message content is thereafter displayed on a web page accessed by the customer via a first data system to notify the customer about the customer's interaction with the at least one second data system.

BRIEF DESCRIPTION OF THE DRAWINGS

Some embodiments are illustrated by way of example and not limitation in the figures of the accompanying drawings in which:

FIG. 5 is an example web page illustrating example message data inserted into the web page in accordance with FIGS. 1-4;

FIG. 6 is an example web page illustrating another example message data inserted into the web page in accordance with FIGS. 1-4;

DETAILED DESCRIPTION

An example system, method and machine readable medium for centralizing and personalizing customer messages from one or more data systems are described. In the following description, for the purposes of explanation, numerous specific details are set forth in order to provide a thorough understanding of example embodiments. It will be evident, however, to one skilled in the art that an example embodiment may be practiced without these specific details.

Figures 1, 2:
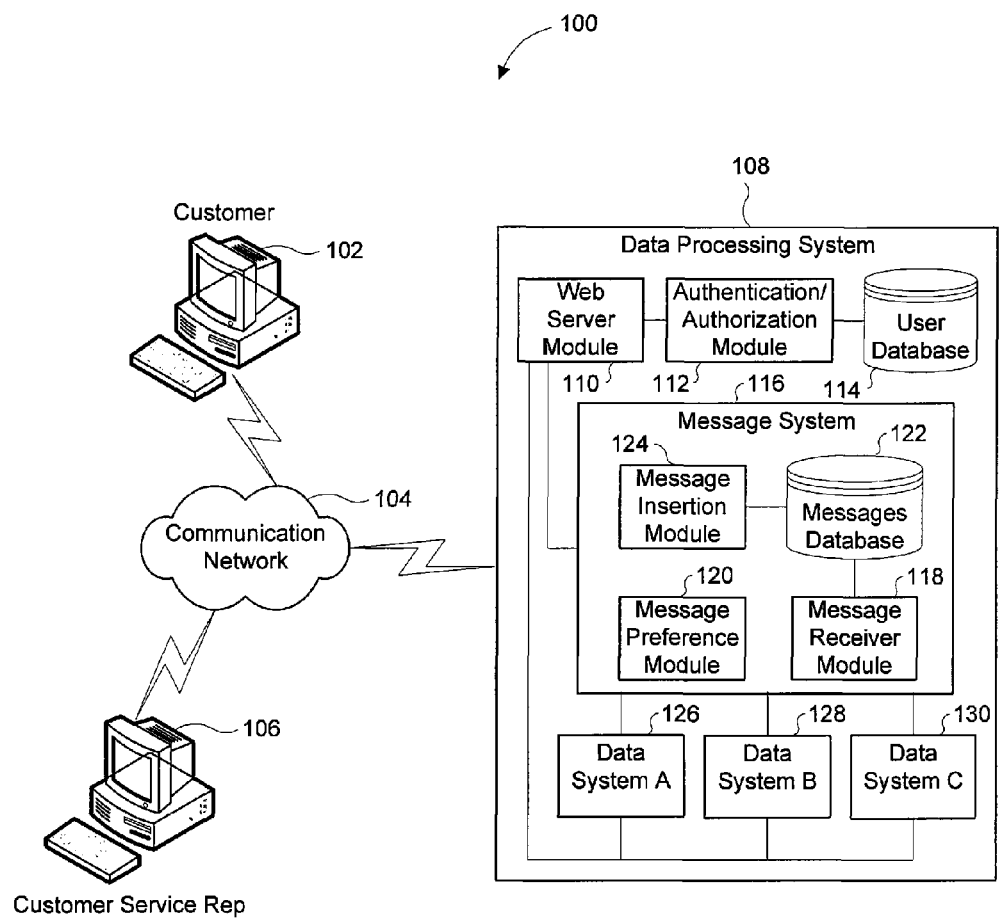
FIG. 1 is a high-level block diagram of an example online system to centralize and personalize customer messages from one or more constituent data systems.
FIG. 2 is a diagram of example message data that may be transmitted from the one or more data systems to a message system for transmission to a customer in one or more web pages by a web server module in accordance with FIG. 1.

FIG. 1 is a high-level block diagram of an example online system 100 to centralize and personalize customer messages from one or more constituent data systems 126-130. The online system 100 is implemented as a client-server system, although it may also be implemented as a peer-to peer system. The online system 100 includes an a data processing system 108, which may be interconnected to at least one customer client computing device (e.g., client) 102 and a customer service representative (CSR) client computing device (e.g., client) 106 via communication network 104. The clients 102, 106 include appropriate network adapters and web browsers for connecting to and communicating with the data processing system 108 via communication network 104. The communication network 104 may be any conventional network, including the Internet, Wide Area Network (WAN), Metropolitan Area Network (MAN), Campus Area Network (CAN), Local Area Network (LAN), Home Area Network (HAN), wireless (802.11), satellite, as well as a variety of different combinations thereof. The communication over network 104 between clients 102, 106 and data processing system 108 may be accomplished via a variety of different protocols, including the Transfer Control Protocol/Internet protocol (TCP/IP) and hyper text transfer protocol (HTTP), as well as other well known protocols.

Further with reference to FIG. 1, the data processing system 108 includes one or more web server modules 110, authentication/authorization module 112, user database 114, message system 116, and data systems A-C (126-130). The one or more web server modules 110 serve one or more web pages to process requests from clients 104, 106, including web pages for interaction with the data processing system 108, message system 116 and data systems 126-130. Some example web pages illustrating centralization and personalization of customer messages will be described in greater detail below with reference to FIGS. 5-7. The authentication/authorization module 112 serves to authenticate/authorize a user to use resources on the data processing system 110. The authentication/authorization module 112 may login (authenticate/authorize) a user (a customer or customer service rep) by receiving and processing an appropriate username/password combination from the client 104, 106. The authentication/authorization module 112 processes the received username/password against the user database 114 in logging in the user to data processing system 108. Among other things, the user database 114 may maintain customer ID for each customer of the data processing system 108. Upon login, a session may be established via a session management module (not shown), during which the user may be identified within data processing system 108 by a customer ID (not shown). The user may be a customer or a customer service representative (CSR).

Still further with reference to FIG. 1, the data systems A-C (126-130) are disparate data systems in the data processing system 108, which may include an insurance system, a banking system, an investment system, a financial planning system, and the like. Messages from these disparate data systems 126-130 may include non-payment of a bill messages, delinquent loan messages, and financial assessment due messages. Other types of message may be easily incorporated into example online system 100 as may be desired. The customer and the CSR (clients 102, 106) may interact with the data processing system 108 and the data systems A-C (126-130) via web server module 110 that serves appropriate one or more web pages clients 102, 106 to process client requests and exchange information between clients 102, 106 and systems 108, 126-130. The exchange of information between the clients 102, 106 and systems 108, 126-130 may be accomplished via web pages that use server-based common gateway interface (CGI), client-based scripts such as Java applets, Java scripts, or ActiveX controls, and the like.

Yet further, each of the data processing system 108 and data systems 126-130, may generate one or more messages for a customer (client 102) identified by customer ID, which may be associated with that customer's account information or other attributes associated with the customer in the respective system 108, 126-130. For example, an attribute associated with a customer may pertain to whether a customer is a business customer, and if so, messages may be generated for business customers within certain zip codes or telephone area codes to alert them to dangerous weather conditions. Each of the systems 108, 126-130 transmits the message for a customer to a centralized message system 116. The message system 116 includes a message receiver module that receives messages from the respective system 108, 126-130 and stores them in the message database 122. The general contents of the message will be described in greater detail with reference to FIG. 2 below. The message system 116 further includes a message preference module 120 through which in conjunction with the web server module 110, customer (client 102) and CSR (client 106) may set up preferences in connection with messages from systems 108, 126-130. For example, preferences may indicate what types of messages may be desired by the customer or required by CSR to be generated by systems 108, 126-130 for the customer. The particular preferences may be transmitted by the message preference module 120 the system 108, 126-130. The message insertion module 124 receives a request from web server module, which includes a customer ID and web page ID (e.g., web page ID may be a path coupled with page name) of a web page to be served to the customer (client 102). Based on customer ID for the customer (client 102), the message insertion module 124 may query the message database 122 to determine whether there is at least one message to be inserted into the web page (identified by page ID) to be transmitted to the customer (client) 102. If it is determined that there is at least one message to be inserted into the web page to be served to the customer, the message insertion module 124 retrieves message content and page positioning/formatting information, and inserts the message content into the web page (web page ID) in formatting and at the location indicated by page positioning/formatting information. The insertion of message content from data systems 126-130 into web pages served by data processing system 108 may be used to notify the customer about the customer's interaction with data systems 126-130 on web pages accessed by the customer via the data processing system 108. Upon insertion, the message insertion module 124 notifies the web server module 110 that the web page (whether or not modified by insertion) may be served to the customer (client 102).

FIG. 2 is a diagram of example message data 200 that may be transmitted from data processing system 108, data systems 126-130 to message system 116 for transmission to a customer (client 102) in one or more web pages by the web server module 110 in accordance with FIG. 1. The message data 200 includes a customer ID 202, a data system ID 204, a message ID 206, a received date/time of message data 208, a page ID, a rule, page positioning/formatting 212, message content, and any other information as may be feasible or required for processing messages in the data processing system 108. As described hereinbefore, the customer ID identifies a customer (client 102) to whom the a message should be transmitted. The data system ID identifies the data system (108, 126-130) from which message data 200 originated. Message ID identifies message data 200. Received date/time 208 identifies the date and time that message date 200 was received by message system from a data system (108, 126-130). Page ID 210 identifies a web page (e.g., page ID may be a page path coupled with page name) into which message content 214 is to be inserted. The rule 216 identifies a rule the result of the execution of which determines whether or not the message content 214 is to be inserted into a web page identified by page ID 210. The page positioning/formatting identifies the location in the web page identified by page ID 210 where the message content 214 is to inserted and the formatting identifies formatting of the message content 214 (e.g., bold, italic and the like). The positioning/formatting information 212 may be used to draw attention of the customer to the customer's interaction with data systems 126-130 on the web page accessed by the customer via data processing system 108. It is to be noted that additional information 216 not enumerated herein may be provided as part of message data 200.

Figure 3:
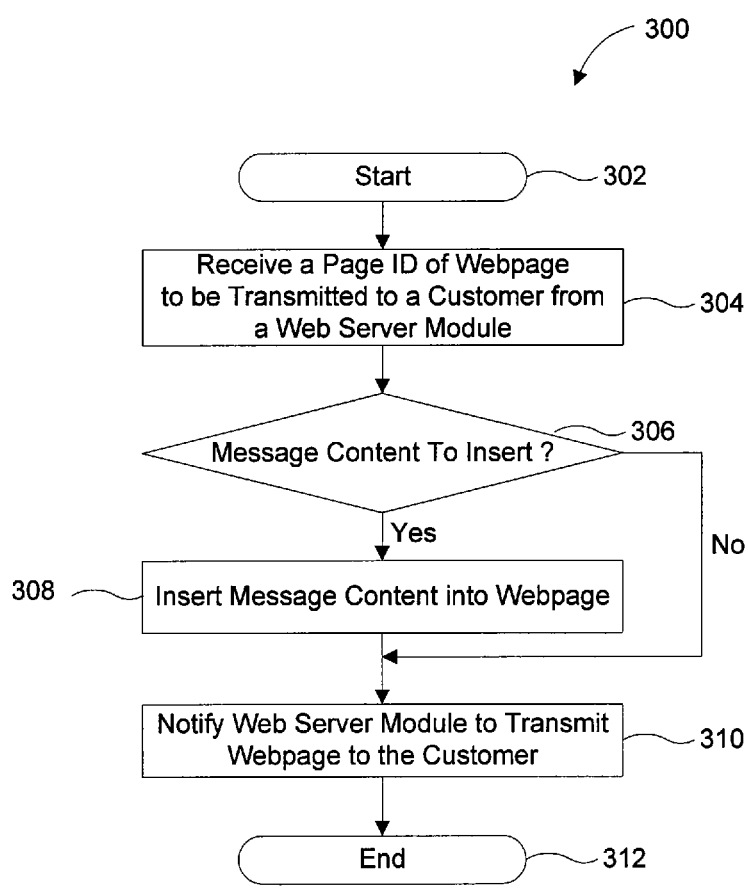
FIG. 3 is a flowchart that illustrates an example method for transmitting message data from a data system to a customer in accordance with FIGS. 1 and 2.

FIG. 3 is a flowchart that illustrates an example method 300 for transmitting message data from a data system (108, 126-130) to a customer (client 102) in accordance with FIGS. 1 and 2. More specifically, the example method 300 starts at operation 302. At operation 304, message insertion module 124 of message system 116 receives customer ID and page ID to be transmitted from web server module 110 to customer 102. The web page may be a page associated with the data processing system 108 or data system 126-130. At operation 306, the message insertion module 124 determines whether there is message content 214 to insert into the web page identified by page ID (e.g., path and file name). The determination may be based on whether there are messages associated with customer ID 202, page ID 210, whether a rule 216 relating to other components of message data 200 is satisfied, and the like. If at operation 306, it is determined that there is no message content to insert, the method 300 continues at operation 312. If it is determined at operation 306 that that there is message content 214 to insert, then at operation 310, message content 214 is inserted into the web page and at operation 310, the message insertion module notifies the web server module 110 that the web page is to be served to the customer (client 102). Thereafter, the example method 300 ends at operation 312.

Figure 4:
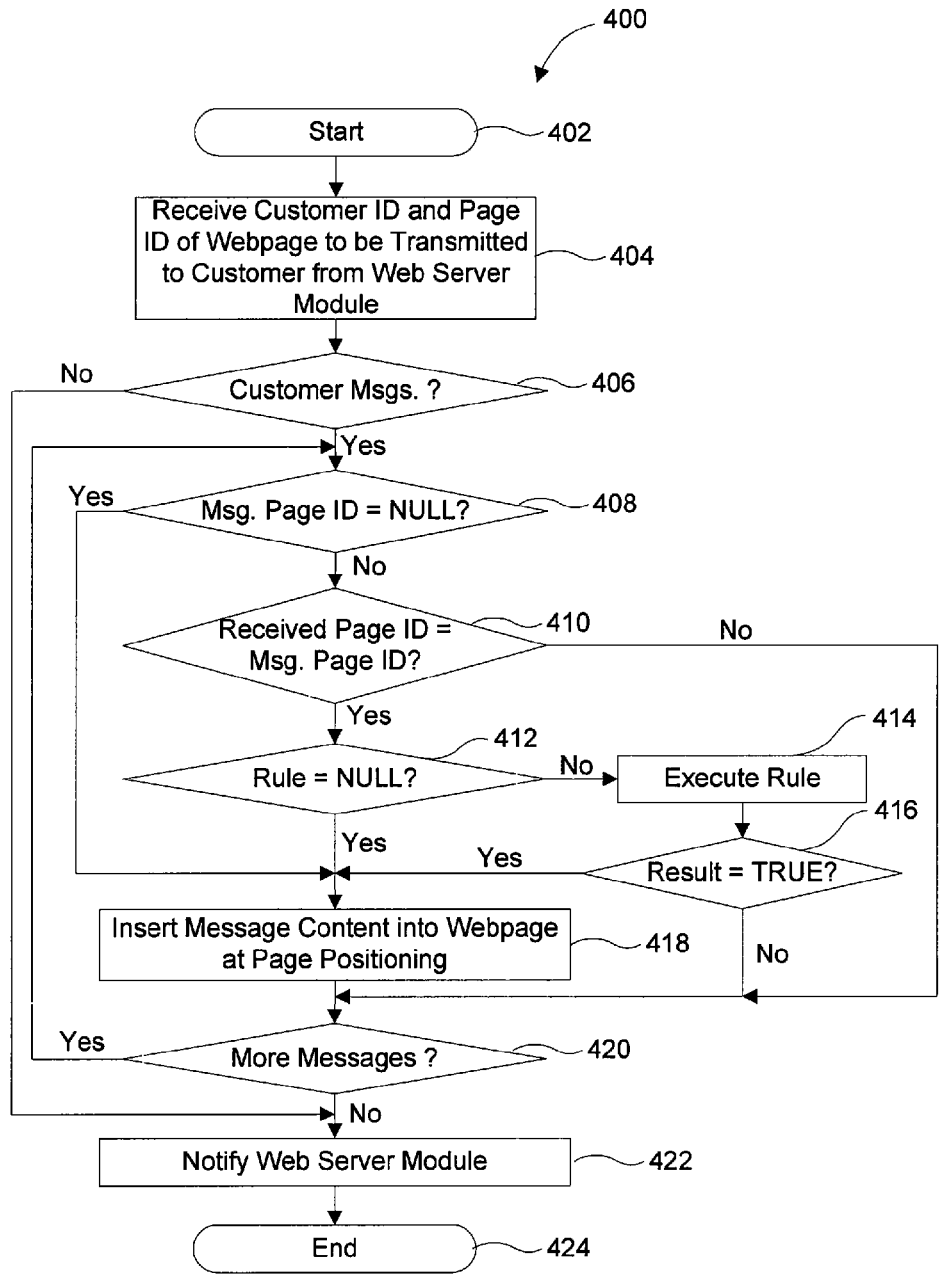
FIG. 4 is a flowchart that illustrates another example method for transmitting message data from a data system to a customer in accordance with FIGS. 1 and 2.

FIG. 4 is a flowchart that illustrates another example method 400 for transmitting message data from a data system (108, 126-130) to a customer (client 102) in accordance with FIGS. 1 and 2. More specifically, the example starts at operation 402. At operation 404, message insertion module 124 of message system 116 receives customer ID and page ID to be transmitted from web server module 110 to customer 102. The web page may be a page associated with the data processing system 108 or any one of the data systems 126-130. At operation 406, the message insertion module 124 determines whether there are customer messages for the customer (e.g., via customer ID). This may be determined by querying message database 122 via customer ID 202. If it is determined there are no customer messages, the method 400 continues at operation 422, where the message insertion module 124 notifies the web server module 110 that there are no customer messages. Upon receipt of notification, the web server module 110 transmits the web page to the customer (client 102).

Further with reference to FIG. 4, if however it is determined that there are customer messages at operation 406, the method 400 continues at operation 408, where the message insertion module 124 determines whether page ID 210 for the determined customer messages is NULL. NULL may be used to transmit message content 214 to the customer (client 102) regardless of the web page the web server module 110 is to serve the customer. If so, the example method 400 continues at operation 418 in which message insertion module 124 inserts message content 214 into the web page at page positioning and with formatting 212. If message insertion module 124 determines that page ID 210 for a determined customer message is not NULL at operation 408, then the method 400 continues at operation 410, where the message insertion module 124 determines whether the page ID received from the web server module 100 is equal to the page ID 210 of the customer message. If the received page ID is not equal to the customer message page ID 210 at operation 410, the method 400 continues at operation 420, where the message insertion module 124 determines whether there are more or other customer messages. Alternatively, if the received page ID is equal to the customer message page ID 210 at operation 410, the method 400 continues at operation 412, where the message insertion module 124 determines whether a rule 216 associated with the customer message is NULL.

Still further with reference to operation 412 of FIG. 4, the rule may be, for example, to insert the message content 214 for transmission to the customer if a current date is within a certain date range. Other rules may be easily devised and employed as may be required for particular implementations. Thus, if there is a rule 216 (e.g., rule not equal NULL), the message insertion module 124 executes the rule at operation 414, and further, the message insertion module 124 determines whether the result of executing the rule is TRUE at operation 416. More specifically, if it is determined that the result of executing the rule is TRUE at operation 416, the method 400 continues at operation 418, where the message insertion module 124 inserts the message content 214 into the web page at position and in format 212. Alternatively, if the result of executing the rule is not TRUE at operation 416, the method 400 continues at operation 410, where the message insertion module 124 determines whether there are more or other customer messages. Returning back to operation 412, if there is no rule 216 (e.g., rule equal NULL), then at operation 418, the message insertion module 124 inserts message content 214 into the web page at page positioning and with formatting 212. Thereafter, at operation 420, the message insertion module 124 determines whether there are any more customer messages for the customer. If so, the method 400 continues at operation 408 to process any additional messages. If there are no more customer messages for the customer, the method continues at operation 422, where the message insertion module 124 notifies the web server module 110 that there are no customer messages. Upon receipt of notification, the web server module 110 transmits the web page to the customer (client 102). The method 400 ends at operation 424.

Figure 5:
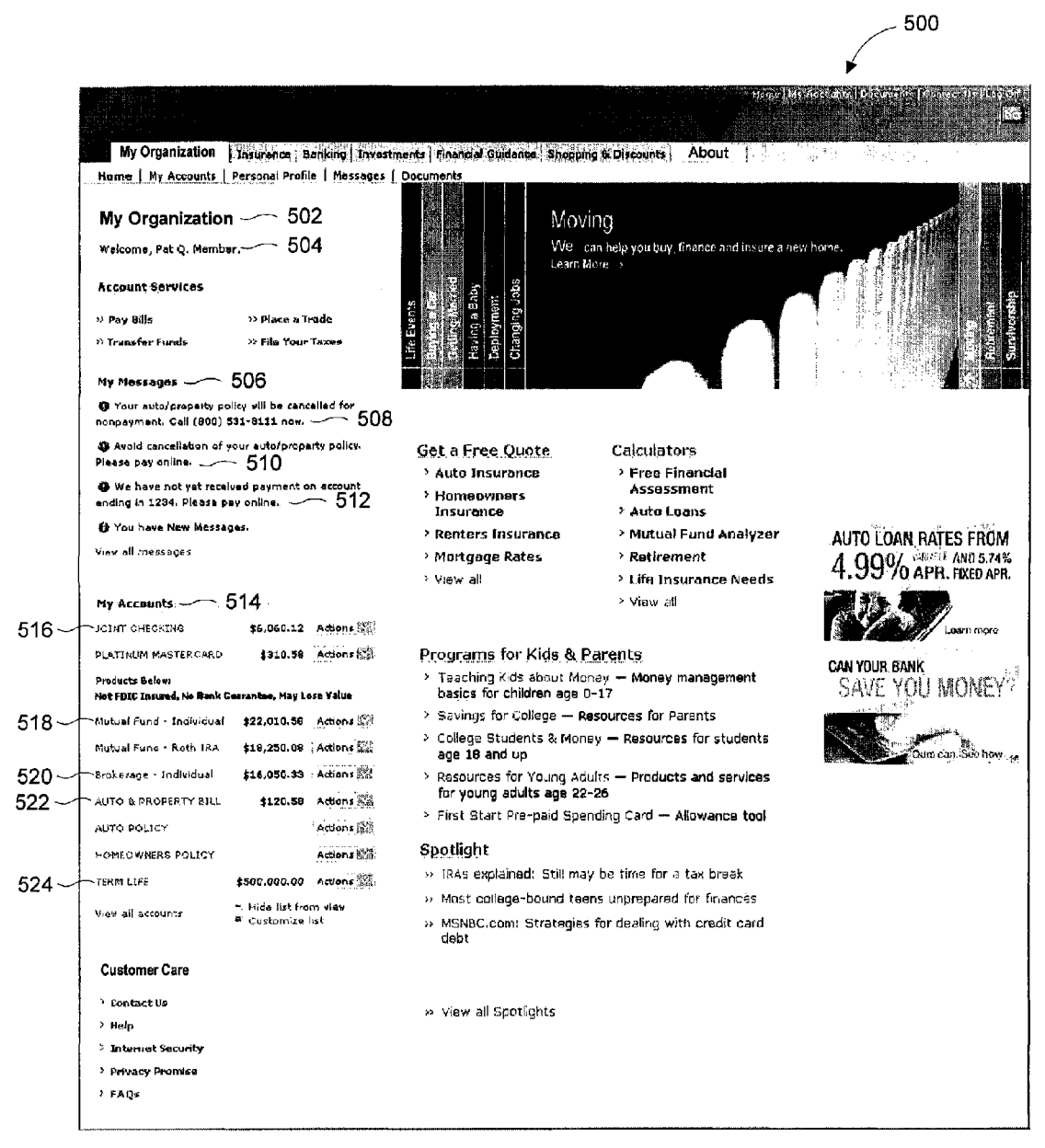

FIG. 5 is an example web page 500 illustrating example message data 506 inserted into the web page 500 in accordance with FIGS. 1-4. More specifically, the webpage 500 is a home page served by web server module 110 for processing client requests and exchanging information between customer 504 (client 102) and systems 108, 126-130. That is, web page 500 is served to customer 504 (client 102) for data processing system 108 (e.g., data processing system 502) and customer 504 may link to other data systems (data system 126-130) via account links 516-524. As illustrated in web page 500, web page 500 displays example message data 506 to the customer 504 in accordance with FIGS. 1-4. As is further illustrated in web page 500, customer 504 may be subscribed to accounts 514 with different data systems (e.g., data systems 126-130 of FIG. 1), such as an account 516 with a banking data system, an account 518 with a mutual funds data system, an account 520 with a brokerage data system, an account 522 with an auto and property insurance data system and an account 524 with a life insurance data system 524. It is to be noted that this is a non-exhaustive listing of data systems. Each of the example message data 508-512 may be associated with a different data system listed above. More specifically, example message data 508 and 510 may be associated with the auto and property insurance data system, while example message data 512 may be associated with the banking data system.

FIG. 6 is an example web page 600 illustrating another example message data 604 inserted into the web page 600 in accordance with FIGS. 1-4. More specifically, webpage 600 is webpage served by web server module 110 for processing client requests and exchanging information between customer 504 (client 102) and a banking data system (e.g., a data system from data systems 126-130). That is, customer 504 has a loan account 602 with the banking data system. The customer message data 604 is associated with that loan account 602 and is inserted into web page 600 in accordance with FIGS. 1-4 described above.

Figure 7:
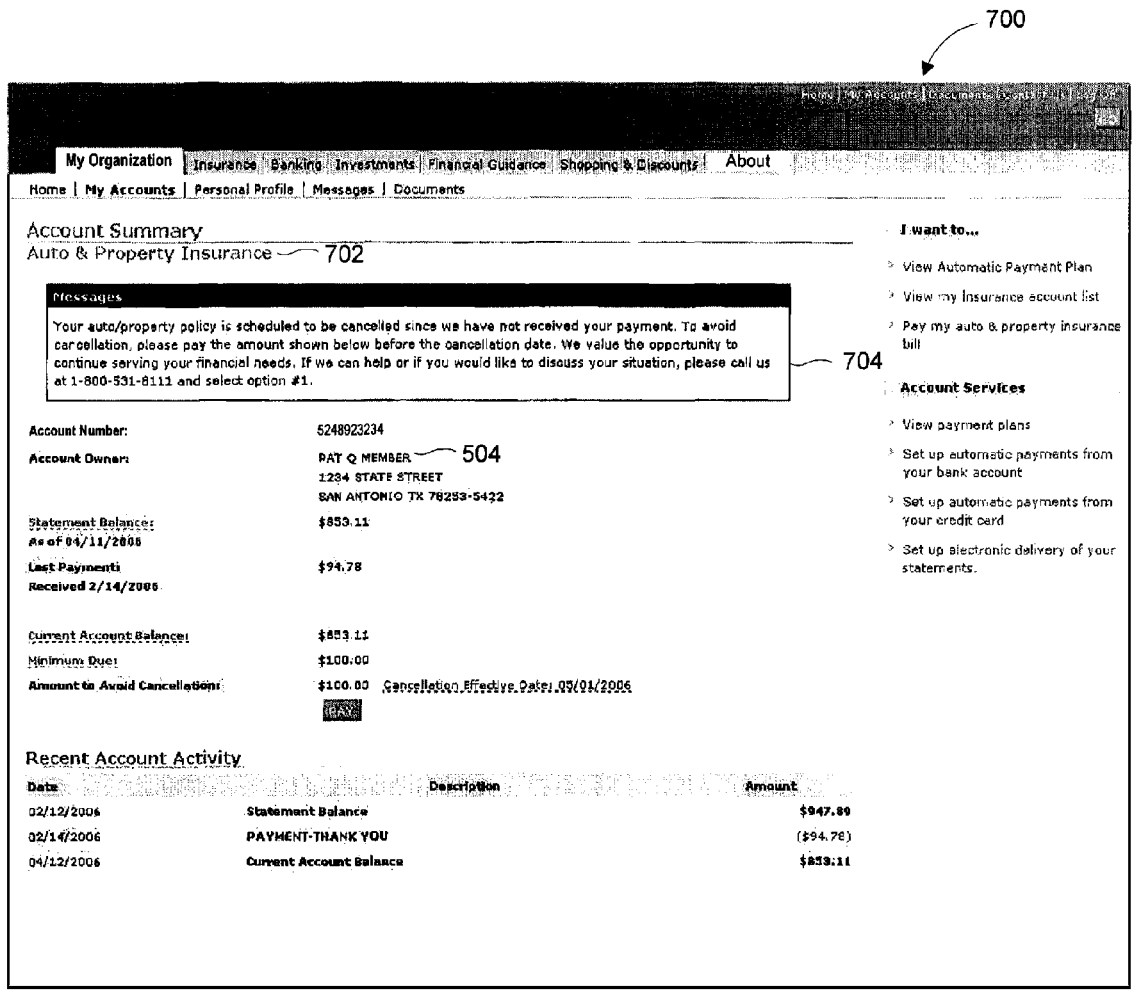
FIG. 7 is an example web page illustrating yet another example message data inserted into the web page in accordance with FIGS. 1-4.

FIG. 7 is an example web page 700 illustrating yet another example message data 704 inserted into the web page 700 in accordance with FIGS. 1-4. More specifically, webpage 700 is webpage served by web server module 110 for processing client requests and exchanging information between customer 504 (client 102) and an automobile and property insurance data system (e.g., a data system from data systems 126-130). That is, customer 504 has an insurance account 702 with the automobile and property insurance data system. The customer message data 704 is associated with that insurance account 602 and is inserted into web page 700 in accordance with FIGS. 1-4 described above.

Figure 8:
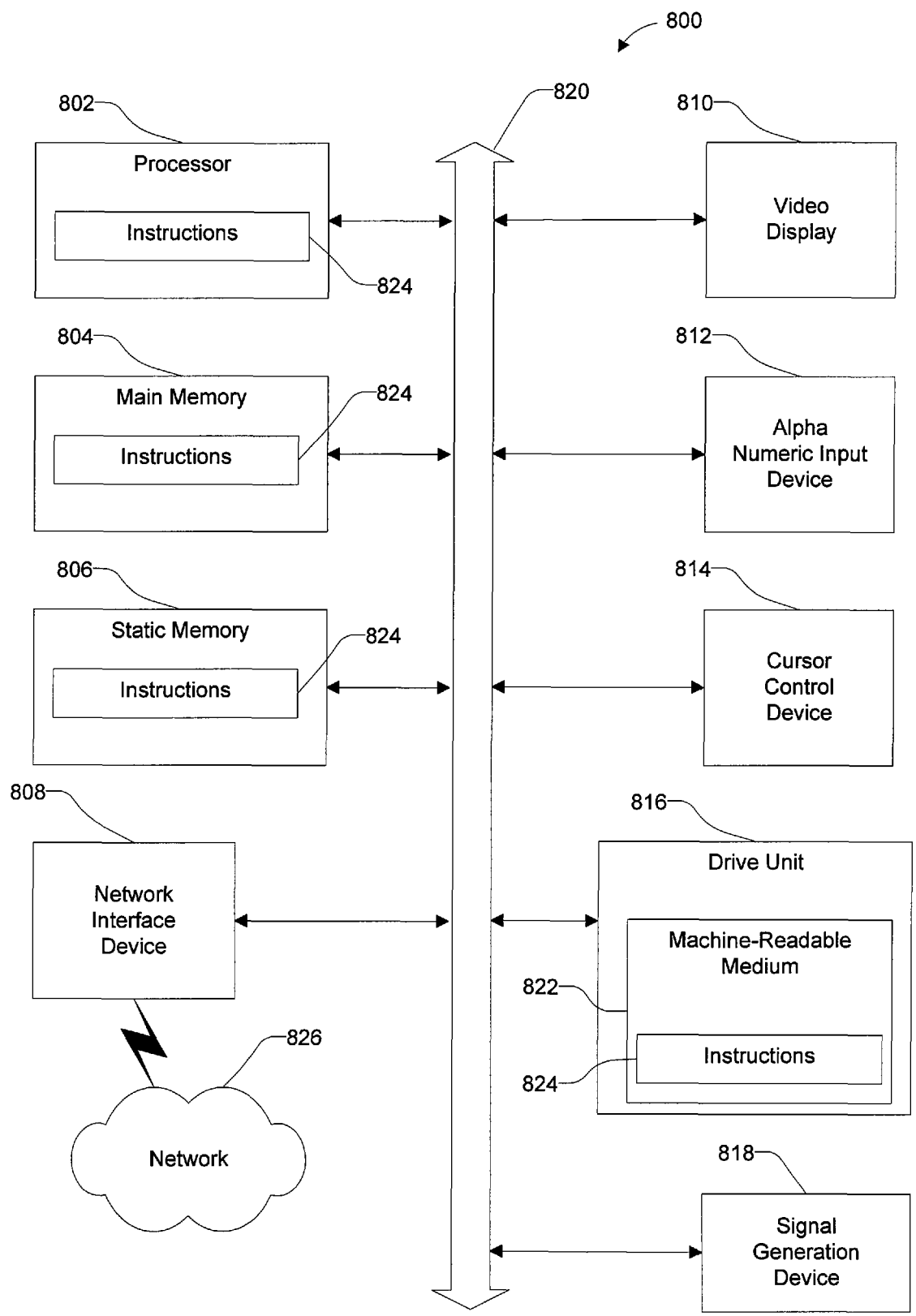
FIG. 8 is a diagrammatic representation of machine in an example form of a computer system within which a set of instructions, for causing the machine to perform any one or more of the methodologies described herein in FIGS. 1-8, may be executed.

FIG. 8 is a diagrammatic representation of machine in an example form of a computer system within which a set of instructions, for causing the machine to perform any one or more of the methodologies discussed herein in FIGS. 1-9, may be executed. In alternative embodiments, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 8, the example computer system 800 includes a processor 802 (e.g., a central processing unit (CPU), a graphics processing unit (GPU) or both), a main memory 804 and a static memory 806, which communicate with each other via a bus 820. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 808.

Still further with reference to FIG. 8, the disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media. The software 824 may further be transmitted or received over a network 826 via the network interface device 808 utilizing any one of a number of well-known transfer protocols (e.g., HTTP).

Lastly with reference to FIG. 8, while the machine-readable medium 822 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for centralizing and personalizing customer messages from one or more data systems have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method for conveying information to a customer, the method comprising:
    generating message content for a number of customers associated with a number of financial services at at least one second data system relating to each customers' interaction with the at least one second data system;
    receiving, by a centralized message system from a number of data systems associated with the number of financial services, a number of messages for the number of customers, wherein each customer is identified by a customer ID and each message includes:
        message content regarding one or more of the financial services, wherein the message content is identified by a customer message page ID;
        the customer ID which identifies a particular customer to whom the message is for;
        a received page ID which identifies a webpage into which the message content is to be inserted; and
        a page position which identifies a location in the identified webpage where the message content is to be inserted;
    receiving, by the centralized message system, an identification of a customer and identification of a webpage to be transmitted to the customer from a first data system, wherein the received identification of the customer includes a received customer ID and wherein the received identification of the webpage includes the received page ID;
    determining, by the centralized message system, whether there is at least one message in the centralized message system from at least one second data system having the customer ID that corresponds to the received customer ID and the customer message page ID that corresponds to the received page ID, wherein the received customer ID is associated with a geographic location of the customer;
    determining, by a message insertion module, whether a rule applies to the message content and, if so, determining, by the message insertion module, whether the message content fits within the rule;
    inserting the message content associated with the at least one message from the at least one second data system into the identified webpage at a location identified by page positioning associated with the at least one message upon notification from the centralized message system that there is at least one message in the centralized message system from at least one second data system having:
        the customer ID that corresponds to the received customer ID;
        the customer message page ID that corresponds to the received page ID; and
        the message content that fits within the rule according to the message insertion module; and
    displaying the message content on a web page accessed by the customer via a first data system to notify the customer about the customer's interaction with the at least one second data system.

2. The method for conveying information to a customer of claim 1, further comprising incorporating with the message content, page positioning information indicating a location on the web page to display the message content to draw attention of the customer to the customer's interaction with the at least one second data system on the web page accessed by the customer via the first data system.

3. The method for conveying information to a customer of claim 1, further comprising incorporating with the message content, formatting information indicating formatting in which to display the message content on the web page to draw attention of the customer to the customer's interaction with the at least one second data system on the web page accessed by the customer via the first data system.

4. The method for conveying information to a customer of claim 1, wherein displaying the message content further includes displaying message content including at least one of:
    non-payment of bill;
    delinquent loan; and
    financial assessment due.

5. The method for conveying information to a customer of claim 1, further comprising transmitting the message content from the at least one second data system to the first data system.

6. The method for conveying information to a customer of claim 5, wherein transmitting the message content further includes:
    receiving the message content from the at least one second data system at a messaging system; and
    transmitting the message content from the messaging system to the first data system.

7. The method for conveying information to a customer of claim 1, wherein generating the message content includes generating the message content according to at least one preference from the customer or a customer service representative.

8. A system for conveying information to a customer, the system comprising:
    a number of data systems associated with a number of financial services; and
    a centralized message system in communication with the data systems, wherein the centralized message system includes a computer processor and computer-readable code stored on a computer-readable medium, which when executed causes the computer processor to:
    generate message content for a number of customers associated with the number of financial services at at least one second data system relating to the customers' interaction with the at least one second data system;
    receive, from the number of data systems, a number of messages for the number of customers of the financial services, wherein each customer is identified by a customer ID and each message includes:
        message content regarding one or more of the financial services wherein the message content is identified by a customer message page ID;
        the customer ID which identifies a particular customer to whom the message is for;
        a received page ID which identifies a webpage into which the message content is to be inserted; and a page position which identifies a location in the identified webpage where the message content is to be inserted;

receive an identification of a customer and identification of a webpage to be transmitted to the customer from a first data system, wherein the received identification of the customer includes a received customer ID and wherein the received identification of the webpage includes the received page ID;

determine whether there is at least one message in the centralized message system from at least one second data system that the customer ID corresponds to the received customer ID and the customer message page ID that corresponds to the received page ID, wherein the received customer ID is associated with a geographic location of the customer;

determine, by a message insertion module, whether a rule applies to the message content and, if so, determine, by the message insertion module, whether the message content fits within the rule;

receive a notification from the centralized message system to insert message content associated with the at least one message from the at least one second data system into the identified webpage at a location identified by page positioning associated with the at least one message if there is at least one message in the centralized message system from at least one second data system having:
 the customer ID that corresponds to the received customer ID;
 the customer message page ID that corresponds to the received page ID; and
 the message content that fits within the rule according to the message insertion module; and transmit a web page displaying the message content on the web page accessed by the customer via the first data system to notify the customer about the customer's interaction with the at least one second data system.

9. The system for conveying information to a customer of claim 8, further comprising a messaging system to incorporate with the message content, page positioning information indicating a location on the web page to display the message content to draw attention of the customer to the customer's interaction with the at least one second data system on the web page accessed by the customer via the first data system.

10. The system for conveying information to a customer of claim 8, further comprising a messaging system to incorporate with the message content, formatting information indicating formatting in which to display the message content on the web page to draw attention of the customer to the customer's interaction with the at least one second data system on the web page accessed by the customer via the first data system.

11. The system for conveying information to a customer of claim 8, wherein message content includes at least one of:
 non-payment of bill;
 delinquent loan; and
 financial assessment due.

12. The system for conveying information to a customer of claim 8, further comprising a messaging system to transmit the message content from the at least one second data system to the first data system.

13. The system for conveying information to a customer of claim 12, wherein the messaging system includes:
 a message receiver module to receive the message content from the at least one second data system at a messaging system; and
 a message insertion module to transmit the message content from the messaging system to the first data system.

14. The system for conveying information to a customer of claim 8, wherein the at least one second data system generates the message content according to at least one preference from the customer or a customer service representative.

15. A non-transitory computer-readable storage medium which executes computer-readable code for conveying information to a customer, wherein the computer-readable code, when executed, causes a computer processor to:
 generate message content for a customer at at least one second data system relating to the customer's interaction with the at least one second data system;
 receive, by a centralized message system from a number of data systems associated with the number of financial services, a number of messages for the number of customers, wherein each customer is identified by a customer ID and each message includes:
  message content regarding one or more of the financial services wherein the message content is identified by a customer message page ID;
  the customer ID which identifies a particular customer to whom the message is for;
  a received page ID which identifies a webpage into which the message content is to be inserted; and
  a page position which identifies a location in the identified webpage where the message content is to be inserted;
 receive, by the centralized message system, an identification of a customer and identification of a webpage to be transmitted to the customer from a first data system, wherein the received identification of the customer includes a received customer ID and wherein the received identification of the webpage includes the received page ID;
 determine, by the centralized message system, whether there is at least one message in the centralized message system from at least one second data system having the customer ID that corresponds to the received customer ID and the customer message page ID that corresponds to the received page ID, wherein the received customer ID is associated with a geographic location of the customer;
 determine, by a message insertion module, whether a rule applies to the message content and, if so, determine, by the message insertion module, whether the message content fits within the rule;
 receive a notification from the centralized message system to insert message content associated with the at least one message from the at least one second data system into the identified webpage at a location identified by page positioning associated with the at least one message if there is at least one message in the centralized message system from at least one second data system having:
  the customer ID that corresponds to the received customer ID; and
  the customer message page ID that corresponds to the received page ID; and
  the message content that fits within the rule according to the message insertion module; and
 display the message content on a web page accessed by the customer via a first data system to notify the customer about the customer's interaction with the at least one second data system.

16. A non-transitory computer-readable medium of claim 15, further comprising instructions causing the machine to incorporate with the message content, page positioning information indicating a location on the web page to display the message content to draw attention of the customer to the customer's interaction with the at least one second data system on the web page accessed by the customer via the first data system.

17. A non-transitory computer-readable medium of claim 15, further comprising instructions causing the machine to incorporate with the message content, formatting information indicating formatting in which to display the message content on the web page to draw attention of the customer to the customer's interaction with the at least one second data system on the web page accessed by the customer via the first data system.

18. A non-transitory computer-readable medium of claim 15, wherein instructions causing the machine to display the message content further include instructions causing the machine to display message content including at least one of:
   non-payment of bill;
   delinquent loan; and
   financial assessment due.

19. A non-transitory computer-readable medium of claim 15, further comprising instructions causing the machine to transmit the message content from the at least one second data system to the first data system.

20. A non-transitory computer-readable medium of claim 19, wherein instructions causing the machine to transmit the message content further include instructions to:
   receive the message content from the at least one second data system at a messaging system; and
   transmit the message content from the messaging system to the first data system.

21. A non-transitory computer-readable medium of claim 15, wherein instructions causing the machine to generate the message content include instructions to generate the message content according to at least one preference from the customer or a customer service representative.

* * * * *